Patented Sept. 26, 1950

2,523,362

UNITED STATES PATENT OFFICE 2,523,362

BARIUM CROWN OPTICAL GLASS

Walter A. Fraser, New Canaan, Conn., Norbert J. Kreidl, Irondequoit, N. Y., and Lee O. Upton, Chicago, Ill., assignors to Bausch & Lomb Optical Company, Rochester, N. Y., a corporation of New York No Drawing. Application March 21, 1946, Serial No. 656,150

4 Claims. (Cl. 106—54)

This invention relates to glasses and more particularly to optical glasses of the barium crown type.

In designing and manufacturing optical systems and lenses, it is frequently necessary, in order to obtain good optical performance, to employ optical glasses having relatively high refractive indices and low dispersions. For example, in order to produce a desirable multifocal ophthalmic lens formed by fusing a glass segment of high refractive index onto a glass blank of lower refractive index, the glass used in the segment should preferably have a relatively high refractive index in order to reduce the thickness of the lens and a relatively low dispersion in order to eliminate the troublesome color fringes around the images produced by the lens. Although barium crown glasses, having indices from 1.53-1.61 and reciprocal relative dispersions from 40-64, indicated by the Greek letter "$\nu$" (nu), have been produced, such glasses are not chemically stable but are susceptible to staining and tarnishing so that the optical performance of lenses made therefrom is impaired. In addition to the requirements as to index, dispersion, and stability, it is also essential that the barium crown glass possess a relatively high expansivity and low softening point when segments of this glass are to be fused to crown glass blanks for making multifocal lenses.

It is an object of the present invention to produce barium crown optical glasses having improved chemical stability. A further object is to provide barium crown optical glasses having increased chemical stability while still retaining the desired optical properties. Another object is to provide barium crown optical glasses having higher refractive indices and lower dispersions without sacrificing chemical stability and resistance to tarnishing and staining. Still another object is to provide barium crown optical glasses which will have chemical stabilities at least as high as the prior art glasses but will also have relatively higher refractive indices and low dispersions, and also possess relatively high expansivities and relatively low softening points. Further objects and advantages will be apparent from the following description.

In the prior art barium crown optical glass batches, in which a part of the silica has been replaced by barium to increase the refractive index, stabilizing oxides of aluminum, boron, zinc, zirconium, titanium, and tin are added, in various combinations, to give chemical stability. If more than about 5% of zirconium oxide is added, there is difficulty in getting it incorporated into the batch because of its high melting point and lack of reaction with silica. While titanium oxide can be easily incorporated into the batch, the use of more than about 5% of it causes the glass to become yellow and greatly increases the dispersion.

If it is desired to produce a barium crown glass having a refractive index, $N_D$ greater than 1.61, more of the silica in the batch must be replaced by barium so that the resulting glass is much less stable and hence cannot be put into practical use for lenses. A surface on prior art barium crown glass of 1.61 index is dissolved immediately upon the application of a one per cent solution of nitric acid at 25° C. When such a glass of index 1.61 is exposed to a one per cent solution of sodium phosphate at 25° C., a silica film one-quarter wave length in thickness will be formed in one day and when such a prior art glass having an index approaching 1.65 is similarly exposed, the silica film will be formed in one hour. Glasses, such as those last mentioned, having such low chemical resistances, cannot, therefore, be put into practical use. When barium crown glass segments are to be fused to ordinary crown glass blanks, as in making multifocal lenses, it is necessary that the glass of the segments have a relatively high expansivity and also a relatively low softening point. It is also essential that no devitrification takes place during the fusion process. These requirements preclude the use of sufficient amounts of titanium oxide to achieve the desired high indices and chemical stabilities and also preclude the use of an appreciable amount of boric oxide, which ordinarily is required in barium glasses of low dispersion. Because of the presence of boric oxide in ordinary barium glass of high index, it is difficult to fuse such glass to ordinary spectacle crown glass.

We have found that barium crown glasses, having high refractive indices, low dispersions, high chemical resistance, higher expansivities, and lower softening points, can be produced by replacing a part of the usual stabilizing oxides by oxides of certain elements, having higher atomic numbers, namely, cadmium, indium, and lanthanum. Cadmium oxide may be used alone or in combination with either lanthanum or indium oxides or both. While the cadmium oxide is effective in providing a glass having a relatively high index, low dispersion, low softening point, and higher expansivity, the cadmium oxide may be combined with lanthanum oxide or indium oxide, or both, when still higher refractive indices are desired. The amount of cadmium oxide used in the batch may vary from about 1-19% and this enables us to produce dense barium crown glasses having refractive indices from about 1.6-1.7 and reciprocal relative dispersions, as expressed by $\nu$, of about 45-60 while the chemical resistivities and expansivities of such glasses will be equal to or better than those of the prior art barium glasses. The amounts of lanthanum oxide used may vary from about 1-8% and the amounts of indium oxide used may vary from about 1-8%. The cadmium oxide is preferably, but not always, used together with either zirconium oxide or titanium oxide, or both, in order to obtain a glass of the desired optical properties while still having a greater chemical resistivity. The amounts of zirconium oxide used with cadmium oxide will usually vary from about 1-6% while the amounts of titanium oxide so used will usually vary from 1-5%. By the practice of our invention, we are able to produce chemically stable barium crown glasses which will not only fuse properly to ordinary crown glasses but which will also possess the desired characteristics of relatively high indices and low dispersions.

The following glass batches, showing the parts of the oxides by weight, are examples of the invention which produce good results:

| Examples | A | B | C | D | E | F | G | H |
|---|---|---|---|---|---|---|---|---|
| $SiO_2$ | 34.7 | 34.0 | 32.4 | 28.7 | 31.0 | 31.0 | 33.25 | 26.7 |
| $B_2O_3$ | 0.7 | 5.5 | 6.9 | 5.0 | 11.0 | 11.0 | 0.75 | 2.0 |
| $Al_2O_3$ | | 2.5 | 0.5 | 7.3 | | | | |
| $TiO_2$ | 2.7 | 2.5 | | | | | | 3.4 |
| $La_2O_3$ | | | 7.4 | | | | 3.5 | |
| $ThO_2$ | | 5.5 | 4.2 | | | | | |
| $ZrO_2$ | 4.0 | | 2.7 | | | | 7.75 | 4.0 |
| $CdO$ | 10.0 | 8.5 | 6.9 | 18.5 | 5.0 | 5.0 | 6.75 | 10.0 |
| $BaO$ | 46.7 | 36.5 | 34.4 | 40.5 | 43.0 | 43.0 | 42.75 | 50.0 |
| $SrO$ | | 4.0 | 3.7 | | | | | |
| $Li_2O$ | 0.7 | | | | | | 1.25 | 1.3 |
| $K_2O$ | | | | | | | 4.0 | |
| $Sb_2O_3$ | | 1.0 | 0.9 | | | | | |
| $In_2O_3$ | | | | | 10.0 | | | |

Characteristics of the glasses resulting from the sample batches are given in the following table which shows the refractive indices ($N_D$), reciprocal relative dispersions ($\nu$), and the time in hours required to produce on the surface of the glass with 1% $HNO_3$ at 25° C. a film having an optical thickness of a quarter wave length of light.

| Examples | A | B | C | D | E | F | G | H |
|---|---|---|---|---|---|---|---|---|
| Index ($N_D$) | 1.664 | 1.650 | 1.661 | 1.642 | 1.650 | 1.655 | 1.66 | 1.690 |
| $\nu$ | 50.0 | 49.5 | 56.0 | 52.0 | 55.0 | 55.0 | 50.0 | 46.0 |
| Filming Time in Hours | 100.0 | 0.1 | 0.2 | 100.0 | 0.0 | 0.0 | 0.01 | 0.05 |

With respect to the chemical resistivities of our glasses, it is to be pointed out that all known barium glasses of the prior art will dissolve in the 1% nitric acid solution or develop a quarter wave film in not more than 10 minutes. Such glasses usually have refractive indices from about 1.53-1.61. It will be apparent, therefore, that the glasses embodying our invention are superior to those of the prior art since our glasses have much greater chemical resistivities as well as relatively higher indices and reciprocal relative dispersions. Thus, for example, glasses indicated as samples A and D not only have a filming time of 100 hours but also have relatively high indices and reciprocal relative dispersions. Glasses, such as examples B, C, E, F, and G, have indices and reciprocal relative dispersions which are higher than those of the prior art glasses and they still possess chemical resistivities which are at least equal to or slightly greater than those of the prior art glasses having lower indices and reciprocal relative dispersions. The glass resulting from the batch indicated by G not only has a high index, a high reciprocal relative dispersion, and a chemical resistivity at least as good as the lower index barium crown glass, but it also possesses desirable characteristics as to softening point and expansivity which allow it to be fused successfully onto ordinary crown glass for making fused multifocal lenses.

From the foregoing it will be apparent that we are able to attain the objects of our invention and provide barium crown optical glasses which possess desirable characteristics not found in the prior art glasses. Various modifications can obviously be made without departing from the spirit of our invention as pointed out in the appended claims.

We claim:

1. A batch for barium crown optical glass having a refractive index of about 1.66 and a reciprocal relative dispersion of about 50, said batch comprising about 42% barium oxide, about 33% silica, about 4% potassium oxide, about 6% cadmium oxide, about 7% zirconium oxide, and about 3% of lanthanum oxide.

2. A barium crown optical glass having a refractive index of about 1.66-1.690 and a reciprocal relative dispersion of about 46-55 and comprising about 26-34% silica, 0.7-11% boron oxide, 34-50% barium oxide and 1-19% cadmium oxide, the remaining ingredients being compatible glass forming oxides.

3. A barium crown optical glass having a refractive index of about 1.66-1.690 and a reciprocal relative dispersion of about 46-55 and comprising about 26-34% silica, 0.7-11% boron oxide, 34-50% barium oxide, 1-19% cadmium oxide and 1-8% lanthanum oxide, the remaining ingredients being compatible glass forming oxides.

4. A barium crown optical glass having a refractive index of about 1.66-1.690 and a reciprocal relative dispersion of about 46-55 and comprising about 26-34% silica, 0.7-11% boron oxide, 34-50% barium oxide, 1-19% cadmium oxide, 1-8% lanthanum oxide and 1-6% zirconium oxide, the remaining ingredients being compatible glass forming oxides.

WALTER A. FRASER.
NORBERT J. KREIDL.
LEE O. UPTON.

REFERENCES CITED

The following references are of record in the file of this patent:

UNITED STATES PATENTS

| Number | Name | Date |
|---|---|---|
| 2,144,943 | Sharp et al. | Jan. 24, 1939 |
| 2,416,392 | Hood | Feb. 25, 1947 |
| 2,435,995 | Armistead | Feb. 17, 1948 |